United States Patent
Schairer et al.

(10) Patent No.: US 11,237,796 B2
(45) Date of Patent: Feb. 1, 2022

(54) METHODS, SYSTEMS, AND APPARATUS FOR PROVIDING COMPOSITE GRAPHICAL ASSISTANT INTERFACES FOR CONTROLLING CONNECTED DEVICES

(71) Applicant: Google LLC, Mountain View, CA (US)

(72) Inventors: David Roy Schairer, San Jose, CA (US); Triona Butler, San Francisco, CA (US); Cindy Tran, Sunnyvale, CA (US); Mark Spates, IV, San Francisco, CA (US); Di Lin, Sunnyvale, CA (US); Yuzhao Ni, Sunnyvale, CA (US); Lisa Williams, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/621,080

(22) PCT Filed: May 7, 2018

(86) PCT No.: PCT/US2018/031443
§ 371 (c)(1),
(2) Date: Dec. 10, 2019

(87) PCT Pub. No.: WO2019/216874
PCT Pub. Date: Nov. 14, 2019

(65) Prior Publication Data
US 2020/0192630 A1      Jun. 18, 2020

(51) Int. Cl.
*G06F 3/16* (2006.01)
*G06F 3/0484* (2013.01)
(Continued)

(52) U.S. Cl.
CPC .......... *G06F 3/167* (2013.01); *G06F 3/04847* (2013.01); *G06F 3/04883* (2013.01);
(Continued)

(58) Field of Classification Search
CPC .. G06F 3/167; G06F 3/04847; G06F 3/04883; G06F 3/14; G06F 3/0484;
(Continued)

(56) References Cited

U.S. PATENT DOCUMENTS

| 5,410,326 | A | * | 4/1995 | Goldstein | .............. | H04N 5/765 |
| | | | | | | 348/734 |
| 5,727,174 | A | * | 3/1998 | Aparicio, IV | ......... | G06Q 10/10 |
| | | | | | | 715/837 |

(Continued)

FOREIGN PATENT DOCUMENTS

| EP | 3093747 A1 | 11/2016 |
| WO | 2014107186 | 7/2014 |

OTHER PUBLICATIONS

Eueropean Patent Office; Intention to Grant issue in Application No. 18730186.6; 44 pages; dated Sep. 7, 2020.
(Continued)

*Primary Examiner* — Jung-Mu T Chuang
(74) *Attorney, Agent, or Firm* — Middleton Reutlinger

(57) ABSTRACT

Methods, apparatus, systems, and computer-readable media are provided for tailoring composite graphical assistant interfaces for interacting with multiple different connected devices. The composite graphical assistant interfaces can be generated in response to a user providing a request for an automated assistant to cause a connected device to perform a particular function. In response to the automated assistant receiving the request, the automated assistant can identify other functions that the connected device is capable of performing. The other functions can then be mapped to various graphical control elements in order to provide a composite graphical assistant interface from which the user can interact with the connected device. Each graphical control element can be arranged according to a status of the connected device, in order to reflect how the connected (Continued)

device is operating simultaneous to the presentation of the composite graphical assistant interface.

16 Claims, 7 Drawing Sheets

(51) Int. Cl.
  *G06F 3/0488* (2013.01)
  *G10L 15/22* (2006.01)
  *H04L 12/58* (2006.01)
(52) U.S. Cl.
  CPC .............. *G10L 15/22* (2013.01); *H04L 51/02*
  (2013.01); *G10L 2015/223* (2013.01)
(58) Field of Classification Search
  CPC . G06F 3/0488; G10L 15/22; G10L 2015/223;
  G10L 2015/221; H04L 51/02
  See application file for complete search history.

(56) References Cited

U.S. PATENT DOCUMENTS

| | | | | |
|---|---|---|---|---|
| 6,791,529 | B2* | 9/2004 | Shteyn | G06F 3/0481 345/156 |
| 7,200,555 | B1* | 4/2007 | Ballard | G10L 15/22 704/235 |
| 8,042,048 | B2* | 10/2011 | Wilson | H04L 12/282 715/736 |
| 8,051,381 | B2* | 11/2011 | Ebrom | H04L 69/26 715/762 |
| 8,296,383 | B2* | 10/2012 | Lindahl | G06F 16/43 709/206 |
| 8,498,572 | B1* | 7/2013 | Schooley | H04L 67/125 455/41.1 |
| 8,731,929 | B2* | 5/2014 | Kennewick | G10L 15/22 704/257 |
| 8,970,792 | B2* | 3/2015 | Chao | H04N 21/42204 348/734 |
| 8,983,383 | B1* | 3/2015 | Haskin | H04M 1/6066 455/41.2 |
| 9,111,214 | B1* | 8/2015 | Sharma | H04L 63/08 |
| 9,172,747 | B2* | 10/2015 | Walters | G06Q 30/02 |
| 9,230,560 | B2* | 1/2016 | Ehsani | H04L 12/281 |
| 9,318,108 | B2* | 4/2016 | Gruber | G10L 21/06 |
| 9,338,493 | B2* | 5/2016 | Van Os | G06F 3/167 |
| 9,368,105 | B1* | 6/2016 | Freed | G10L 15/22 |
| 9,438,440 | B2* | 9/2016 | Burns | G01S 11/16 |
| 9,489,616 | B2* | 11/2016 | Sharma | G06Q 50/12 |
| 9,614,690 | B2* | 4/2017 | Ehsani | H04L 12/281 |
| 9,747,083 | B1* | 8/2017 | Roman | G06F 8/34 |
| 9,811,312 | B2* | 11/2017 | Bjorkengren | G06F 3/167 |
| 9,830,044 | B2* | 11/2017 | Brown | G06Q 50/20 |
| 9,858,925 | B2* | 1/2018 | Gruber | G10L 15/18 |
| 9,930,398 | B2* | 3/2018 | Lee | H04W 4/70 |
| 9,935,904 | B2* | 4/2018 | Sharma | H04L 67/12 |
| 9,990,921 | B2* | 6/2018 | VanBlon | G06K 9/00604 |
| 10,013,976 | B2* | 7/2018 | Woodall | G10L 15/22 |
| 10,026,229 | B1* | 7/2018 | Yalniz | G06K 9/00671 |
| 10,027,920 | B2* | 7/2018 | Freiin von Kapri | H04N 21/43615 |
| 10,047,970 | B2* | 8/2018 | Nelson | G05D 23/1902 |
| 10,088,972 | B2* | 10/2018 | Brown | G06F 9/453 |
| 10,114,351 | B2* | 10/2018 | Fadell | H04L 12/2823 |
| 10,127,011 | B2* | 11/2018 | Bang | G06F 3/04842 |
| 10,134,395 | B2* | 11/2018 | Typrin | G10L 17/00 |
| 10,248,399 | B2* | 4/2019 | Yoon | G06F 8/61 |
| 10,445,115 | B2* | 10/2019 | Brown | G06F 3/167 |
| 10,567,477 | B2* | 2/2020 | Sumner | G06F 3/167 |
| 10,594,796 | B2* | 3/2020 | Verma | G06F 3/0482 |
| 10,943,606 | B2* | 3/2021 | Doshi | G10L 15/04 |
| 2003/0105637 | A1* | 6/2003 | Rodriguez | G10L 19/008 704/270 |
| 2003/0117365 | A1* | 6/2003 | Shteyn | G10L 15/26 345/156 |
| 2005/0097478 | A1* | 5/2005 | Killian | H04L 67/125 715/851 |
| 2005/0149927 | A1* | 7/2005 | Abe | G06F 9/4887 718/100 |
| 2006/0028337 | A1* | 2/2006 | Li | G08C 17/00 340/539.1 |
| 2006/0064694 | A1* | 3/2006 | Messer | G06Q 10/1097 718/100 |
| 2006/0236325 | A1* | 10/2006 | Rao | H04L 67/34 719/315 |
| 2007/0112939 | A1* | 5/2007 | Wilson | H04L 12/282 709/219 |
| 2009/0144735 | A1* | 6/2009 | Kim | G06F 9/451 718/100 |
| 2009/0171664 | A1* | 7/2009 | Kennewick | G10L 15/22 704/257 |
| 2009/0183070 | A1* | 7/2009 | Robbins | H04B 1/202 715/702 |
| 2010/0161082 | A1* | 6/2010 | Ebrom | H04L 67/12 700/17 |
| 2012/0016678 | A1* | 1/2012 | Gruber | G10L 15/183 704/275 |
| 2012/0232906 | A1* | 9/2012 | Lindahl | G10L 15/30 704/270.1 |
| 2012/0265528 | A1* | 10/2012 | Gruber | G10L 15/183 704/235 |
| 2013/0033649 | A1* | 2/2013 | Kim | G06F 3/017 348/734 |
| 2013/0063369 | A1* | 3/2013 | Malhotra | G06F 3/04883 345/173 |
| 2013/0082526 | A1* | 4/2013 | Lee | H02J 13/00004 307/31 |
| 2013/0082827 | A1 | 4/2013 | Cho et al. | |
| 2013/0139089 | A1* | 5/2013 | Cho | G06F 3/0484 715/771 |
| 2013/0174034 | A1* | 7/2013 | Brown | G06Q 10/10 715/708 |
| 2013/0226580 | A1* | 8/2013 | Witt-Ehsani | G10L 15/063 704/244 |
| 2013/0231937 | A1* | 9/2013 | Woodall | G06F 3/013 704/275 |
| 2013/0283168 | A1* | 10/2013 | Brown | G06F 3/04842 715/728 |
| 2014/0098247 | A1* | 4/2014 | Rao | H04W 4/20 348/207.1 |
| 2014/0108019 | A1* | 4/2014 | Ehsani | G06F 40/242 704/275 |
| 2014/0135076 | A1* | 5/2014 | Lee | H04M 1/6041 455/569.1 |
| 2014/0136195 | A1* | 5/2014 | Abdossalami | H04M 3/2236 704/235 |
| 2014/0167931 | A1* | 6/2014 | Lee | H04L 12/2818 340/12.5 |
| 2014/0218517 | A1* | 8/2014 | Kim | H04N 7/181 348/143 |
| 2014/0244712 | A1* | 8/2014 | Walters | G06F 3/167 709/202 |
| 2014/0317502 | A1* | 10/2014 | Brown | G06F 9/453 715/706 |
| 2015/0022724 | A1* | 1/2015 | Chao | H04N 21/42204 348/734 |
| 2015/0053780 | A1* | 2/2015 | Nelson | G05D 23/1902 236/1 C |
| 2015/0074524 | A1* | 3/2015 | Nicholson | G06F 3/167 715/706 |
| 2015/0082225 | A1* | 3/2015 | Shearer | G06F 3/0482 715/771 |
| 2015/0088514 | A1* | 3/2015 | Typrin | G06F 3/167 704/249 |
| 2015/0140990 | A1* | 5/2015 | Kim | H04W 8/186 455/418 |
| 2015/0160797 | A1* | 6/2015 | Shearer | H04L 12/2816 715/740 |
| 2015/0186154 | A1* | 7/2015 | Brown | G06F 3/04817 715/706 |

(56) References Cited

U.S. PATENT DOCUMENTS

| | | | | |
|---|---|---|---|---|
| 2015/0186156 A1* | 7/2015 | Brown | G06F 3/167 | 715/706 |
| 2015/0195365 A1* | 7/2015 | Choi | H04W 4/021 | 715/739 |
| 2015/0213355 A1* | 7/2015 | Sharma | G06F 3/167 | 706/11 |
| 2015/0254057 A1* | 9/2015 | Klein | H04N 21/42222 | 704/275 |
| 2015/0278678 A1* | 10/2015 | Sharma | G06F 3/0482 | 706/11 |
| 2015/0324706 A1* | 11/2015 | Warren | G05B 15/02 | 700/275 |
| 2015/0347114 A1* | 12/2015 | Yoon | H04L 12/2832 | 235/375 |
| 2015/0348554 A1* | 12/2015 | Orr | H04L 12/2816 | 704/275 |
| 2015/0365480 A1* | 12/2015 | Soto | H04L 12/281 | 709/224 |
| 2015/0382047 A1* | 12/2015 | Van Os | G10L 17/22 | 725/38 |
| 2016/0034253 A1* | 2/2016 | Bang | G06F 9/451 | 715/728 |
| 2016/0041534 A1* | 2/2016 | Gupta | H04W 4/70 | 700/275 |
| 2016/0080165 A1* | 3/2016 | Ehsani | H04L 12/282 | 704/9 |
| 2016/0179462 A1* | 6/2016 | Bjorkengren | G10L 15/22 | 704/275 |
| 2016/0196820 A1* | 7/2016 | Williams | G10L 15/18 | 704/244 |
| 2016/0226732 A1* | 8/2016 | Kim | H04L 12/2807 | |
| 2016/0259308 A1* | 9/2016 | Fadell | H04W 4/80 | |
| 2016/0259656 A1* | 9/2016 | Sumner | G06F 3/04842 | |
| 2016/0260431 A1* | 9/2016 | Ewen | G10L 15/32 | |
| 2016/0260436 A1* | 9/2016 | Lemay | G10L 15/28 | |
| 2016/0283191 A1* | 9/2016 | Lu | G11B 27/105 | |
| 2016/0334963 A1* | 11/2016 | Heo | G06F 3/04817 | |
| 2016/0358443 A1* | 12/2016 | True | G08B 25/08 | |
| 2017/0026692 A1* | 1/2017 | Lee | H04N 21/4432 | |
| 2017/0048476 A1* | 2/2017 | Freiin von Kapri | H04N 5/4403 | |
| 2017/0063611 A1* | 3/2017 | Sheba | H04L 41/22 | |
| 2017/0097621 A1* | 4/2017 | Ackmann | G05B 15/02 | |
| 2017/0188437 A1* | 6/2017 | Banta | H04R 1/028 | |
| 2017/0192409 A1* | 7/2017 | Kim | G05B 15/02 | |
| 2017/0230316 A1* | 8/2017 | Sharma | H04L 63/0884 | |
| 2017/0230461 A1* | 8/2017 | Verma | H04L 12/2803 | |
| 2017/0263249 A1* | 9/2017 | Akbacak | G10L 15/08 | |
| 2017/0358304 A1* | 12/2017 | Castillo Sanchez | G06F 3/04842 | |
| 2018/0108351 A1* | 4/2018 | Beckhardt | G06F 3/165 | |
| 2018/0285065 A1* | 10/2018 | Jeong | G06F 3/167 | |
| 2019/0034604 A1* | 1/2019 | Zheng | G10L 15/30 | |
| 2019/0036923 A1* | 1/2019 | Xuan | H04L 63/083 | |
| 2019/0043498 A1* | 2/2019 | Pillai | G10L 15/24 | |
| 2019/0115099 A1* | 4/2019 | Goux | G16H 40/20 | |
| 2019/0124063 A1* | 4/2019 | Cui | H04L 63/083 | |
| 2019/0164546 A1* | 5/2019 | Piernot | G06F 40/56 | |
| 2019/0295544 A1* | 9/2019 | Garcia | G06F 40/30 | |
| 2019/0310824 A1* | 10/2019 | Sung | G10L 15/1815 | |
| 2019/0318759 A1* | 10/2019 | Doshi | G10L 15/19 | |
| 2019/0332361 A1* | 10/2019 | Batra | G06F 3/017 | |
| 2019/0340243 A1* | 11/2019 | Beaver | G06F 40/30 | |
| 2020/0257494 A1* | 8/2020 | Babushkin | G06F 16/3329 | |
| 2020/0312318 A1* | 10/2020 | Olson | G10L 15/22 | |
| 2021/0193176 A1* | 6/2021 | Doshi | G10L 15/19 | |

OTHER PUBLICATIONS

European Patent Office; Summons to Attend Oral Proceedings issued in App. No. 18730186.6; 6 pages; dated Jan. 24, 2020.

European Patent Office; International Search Report and Written Opinion of Ser. No. PCT/US2018/031443; 16 pages; dated Dec. 20, 2018.

European Patent Office; Communication issued in App. No. 18730186.6; 8 pages; dated Jul. 24, 2019.

European Patent Office; Communication issued in Application No. 20212243.8; 14 pages; dated Apr. 9, 2021.

* cited by examiner

METHODS, SYSTEMS, AND APPARATUS FOR PROVIDING COMPOSITE GRAPHICAL ASSISTANT INTERFACES FOR CONTROLLING CONNECTED DEVICES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input.

Some automated assistants can be used to control internet of things ("IoT") devices. However, many IoT devices can come with their own corresponding applications. As a result, a user that has acquired multiple different IoT devices may be tasked with installing a variety of third party applications on their personal computing devices. Because applications can typically require memory, network bandwidth, updates, and/or other resources, having a variety of similar applications on a single device can be inefficient. Although a user may rely on an automated assistant to mediate interactions between the user and a particular IoT device, such interactions can frequently require spoken utterances from the user to be converted from audio to text. In order to effectuate conversion of audio to text, audio data oftentimes must be sent over a network, thereby consuming significant network bandwidth. Furthermore, mediating interactions in such a way can prove unreliable when a user is surrounded by other people that are talking, or is otherwise in environment with background noise. As a result, a dialog session between a user and an automated assistant may waste computational resources and network resources when a request for an IoT device to perform a particular function is ultimately not identified, or otherwise not fulfilled.

SUMMARY

The present disclosure is generally directed to methods, apparatus, and computer-readable media (transitory and non-transitory) for providing composite graphical assistant interfaces through which to control multiple different devices. As network connectivity of common devices, such as lightbulbs and other appliances, becomes more prevalent, the ways of interfacing with such devices over a network can increase. This can be in part due to an increasing number of manufacturers making similar devices. For instance, there may be dozens of smart lightbulb manufacturers, and a majority of the lightbulb manufacturers may offer applications or interfaces from which to control their respective lightbulbs. As a result, a user that installs lightbulbs from different manufacturers may download different applications to their personal computing devices for controlling the lightbulbs. This can waste memory, as installing multiple applications can occupy a substantial amount of device memory, and can also waste network bandwidth, as having multiple applications on a device can cause the device to check for updates, share data, and/or push notifications for a respective manufacturer. In order to overcome these and/or other limitations, some implementations described herein provide various techniques for an automated assistant to generate composite graphical assistant interfaces for controlling various devices, despite the devices being provided by different third parties.

A composite graphical assistant interface can be an interface compiled from one or more graphical elements in order to effectuate control of one or more devices. The composite graphical assistant interface can be employed by an automated assistant, which can act as an intermediary between the user and any connected devices. For example, a user can provide a spoken utterance such as, "Assistant, turn on my kitchen lights." The spoken utterance can be received at a client device, which can include one or more microphones and a display panel, and in response, the automated assistant can cause any lights in a kitchen of a home of the user to turn on. Furthermore, the automated assistant can identify a type of "internet of things" (IoT) device that the user has requested the automated assistant to control, and identify one or more control parameters associated with the type of IoT device. The control parameters can correspond to slot values, which can be supplied to the IoT device for modifying a state of the IoT device, therefore the control parameters can be identified by analyzing acceptable slot values for the IoT device. For instance, an IoT device such as a smart lightbulb can receive slot values such as "on" and "off," which can correspond to an illumination state of the lightbulb, and/or a color values such as "red," "green," and "blue," which can correspond to color states of the lightbulb. Furthermore, the IoT device can receive slot values such as any number between 0 and 100, which can correspond to brightness states for the lightbulb. When the automated assistant has identified all possible slot values and/or resulting states of an IoT device, the automated assistant can identify suitable graphical control elements from which to compile a composite graphical assistant interface.

For instance, in some implementations, the automated assistant can identify a total number of slot values for a given function of a particular IoT device and correlate the function to a graphical control element. The automated assistant can select a graphical control element that has two states, similar to a two-position electrical switch, when selecting the graphical control element for a function with two slot values (e.g., "on" and "off"). Furthermore, the automated assistant can select a graphical control element that has color-coded inputs, such as an array of colored buttons, when selecting the graphical control element for a function with names of colors as slot values (e.g., "red," "green," and "blue,"). Moreover, the automated assistant can select a graphical control element that resembles a dial control, such as a potentiometer, when selecting the graphical control element for a function that has at least a threshold number of slot values (e.g., more than two, more than five, more than ten, etc.).

When the automated assistant has selected one or more suitable graphical control elements from which to generate the composite graphical assistant interface, the automated assistant can then cause the client device to display the composite graphical assistant interface. For instance, in response to receiving the spoken utterance, "Assistant, turn on my kitchen lights," the automated assistant can cause the kitchen lights to turn on and also cause the client device to display the composite graphical assistant interface with the selected graphical control elements. The composite graphical assistant interface would therefore be displayed at the display panel of the client device with graphical control elements such as a two-position switch for turning on and off the lights, a color-coded control input for controlling a color of the lights, and/or dial control for adjusting a brightness of the lights. In these and other manners, rather than having to access a unique application for each respective device and/or each respective device manufacturer, the automated assistant can generate similar interfaces with familiar graphical control elements the user can engage with to modify states of certain devices. Also, by compiling composite graphical assistant interfaces in such a manner, network bandwidth can be preserved, as the client device would not necessarily have to communicate with a remote server to process spoken utterances.

Moreover, in various implementations, and as described above and elsewhere herein, a graphical assistant interface to control function(s) of a connected device(s) is rendered in response to a spoken command to control the connected device(s). For example, in response to a spoken input of "adjust the thermostat to 72 degrees", an interactive assistant interface can be rendered that reflects the change of the thermostat set point to 72 degrees, that enables touch interactions to further adjust the controlled set point function, and that enables touch interactions to further adjust additional function(s) (e.g., humidity functions, fan on/off functions, etc.). In these and other manners, the presented assistant interface further assists the user in continuing performance of the control of the connected device. Further, the presented interface can enable more network resource and/or computational resource efficient further adjustment of the functions as compared to, for example, further adjustments effectuated through further spoken inputs.

In some implementations, states of a device can be reflected at the composite graphical assistant interface presented by the automated assistant. For example, in response to receiving the spoken utterance, "Assistant, please turn on my kitchen lights," the automated assistant can cause the aforementioned composite graphical assistant interface to be presented at a display panel of a client device. Furthermore, after the automated assistant has caused the kitchen lights to turn on, the automated assistant can identify a resulting state of the kitchen lights (e.g., State: [lights:"on"], . . . ) and configure the graphical control element of the composite graphical assistant interface to represent the state of the kitchen lights. For instance, the graphical control element for controlling the kitchen lights can be presenting in an "on" state in order to reflect the change of state that the user caused by issuing the spoken utterance to the automated assistant. In some implementations, other states of the device can also be reflected at the composite graphical assistant interface. For example, when a brightness level of the kitchen lights is at 50% when the user provides the spoken utterance, the automated assistant can cause the dial that controls the brightness level of the kitchen lights to be positioned at 50%. In other words, in response to the automated assistant receiving a particular spoken utterance that modifies a state of an IoT device, the automated assistant can retrieve (or receive) additional state information from the IoT device in order to accurately reflect the state of the IoT device to a user. Furthermore, in response to the automated assistant receiving the particular spoken utterance, the automated assistant can determine other functions capable of being performed by the IoT device. This can allow the automated assistant to compile a more comprehensive composite graphical assistant interface that is reflective of multiple controls that can employed for modifying a state of the IoT device.

By providing a graphical assistance interface that is reflective of a user's previous interactions with an automated assistant, improved efficiency of user interaction may be facilitated. In particular, related assistant tasks, such as control of IoT devices, may be facilitated with a reduced set of interactions, thereby reducing the consumption of computer and network resources associated with those interactions. Moreover, in some examples, an initial interaction may be carried out through an alternative modality—such as through recognition of an utterance—which is particularly suited to certain controls (e.g. binary selection of an on or off state) but may not be as efficient for related functions (such as fine control of a preferred level or balance). Appropriate modalities for each function can therefore be presented in an automated and efficient manner. Furthermore, the provision of a graphical interface may enhance discoverability of functions related to an initial user input.

The above description is provided as an overview of some implementations of the present disclosure. Further description of those implementations, and other implementations, are described in more detail below.

In some implementations, a method implemented by one or more processors is set forth as including operations such as determining that a spoken utterance, detected via an automated assistant interface, includes a request to modify a state of a connected device that is linked with a client device. The spoken utterance is provided by a user. The method can further include identifying, in response to receiving the request, a function that corresponds to the received request; causing, based on identifying the function, the connected device to perform the function that corresponds to the received request; and determining a current state of the connected device. The current state of the connected device can be affected by performance of the function. The method can also include identifying one or more other functions capable of being performed by the connected device. The current state of the connected device can be further affected by performance of the one or more other functions. The method can further include determining, based on identifying the function and the one or more other functions, a first graphical control element for controlling the function performed by the connected device and a second graphical control element for controlling the one or more other functions. The method can also include determining, based on the current state of the connected device, a configuration for each graphical control element of the first graphical control element and the second graphical control element; and causing, in response to receiving the request, a display panel associated with the client device to provide a composite graphical assistant interface for controlling the connected device. The composite graphical assistant interface can include the first graphical control element and the second graphical control element, which are arranged according to the determined configuration for each graphical control element.

In some implementations, the method can include determining that the user has selected, at the display panel, the second graphical control element, which corresponds to an additional function of the one or more other functions; causing, in response to determining that the user has selected the second graphical control element, the connected device to perform the additional function, wherein performance of the additional function causes the connected device to exhibit a modified state; and causing, in response to the connected device performing the additional function, the second graphical control element to reconfigure according to the modified state.

In some implementations the display panel includes a touch interface through which the user can directly control the first graphical control element and the second graphical control element using one or more gesture inputs. In some implementations, the method can include determining a third graphical control element for controlling an additional function of the one or more functions, and a selectable link configured to link to the third graphical control element. Causing the display panel associated with the first client device to provide the composite graphical assistant interface can include causing the selectable link to be provided at the composite graphical assistant interface.

In some implementations, the method can include determining that the user has selected the selectable link at the display panel; and causing, in response to determining the user has selected the selectable link, the composite graphical assistant interface to provide the third graphical control element.

In some implementations, wherein the client device lacks an integrated display panel, and the method can further include determining that the client device lacks the integrated display panel; and identifying, in response to determining that the client device lacks the integrated display panel, an additional connected device that incorporates the display panel and is linked to the client device. Causing the display panel to provide the composite graphical assistant interface can include causing the display panel of the additional connected device to render the composite graphical assistant interface. In some implementations, identifying the additional connected device includes: selecting the additional connected device, from a plurality of candidate devices, based on a stored device topology that indicates a proximity of the additional connected device relative to the client device.

In other implementations, a method implemented by one or more processors is set forth as including operations such as determining that a spoken utterance, detected via an automated assistant interface, includes a request for a connected device to perform a function. The spoken utterance can be provided by a user and the connected device is linked to a client device. The method can also include identifying, in response to receiving the request, the function that corresponds to the received request; causing, based on identifying the function, the connected device to perform the function that corresponds to the received request; and determining, based on historical interaction data that is accessible to the client device, one or more other functions previously performed by the connected device according to a previous request from the user. The method can further include determining, based on identifying the one or more other functions, a graphical control element for controlling the one or more other functions; and causing, in response to receiving the request, a display panel associated with the client device to provide a composite graphical assistant interface for controlling the connected device. The composite graphical assistant interface can include the graphical control element.

In some implementations, the method can include determining a profile for the user based on a voice characteristic associated with the spoken utterance. Causing the composite graphical assistant interface to be provided at the client device can include causing the composite graphical assistant interface to include a plurality of graphical control elements that are arranged based on the determined profile.

In some implementations, the plurality of graphical control elements omits at least one available graphical control element based on a preference of the user indicated by the determined profile. In some implementations, the method can include requesting, from a remote server device, state data that indicates a current state of the connected device. The current state of the connected device can be affected by the one or more functions previously performed by the connected device. The method can further include receiving the state data from the remote server device; and determining a configuration for the graphical control element based on the state data. The graphical control element can be arranged at the composite graphical assistant interface according to the determined configuration.

In some implementations, the method can include receiving, in response to requesting the state data, command data corresponding to an additional function for modifying the current state of the connected device. In some implementations, the method can include determining an additional graphical control element for controlling the additional function and a selectable link. Causing the display panel associated with the client device to provide the composite graphical assistant interface can include causing the composite graphical assistant interface to include the selectable link. The selectable link can be configured to reveal the additional graphical control element in response to receiving a user selection of the selectable link.

In yet other implementations, a method implemented by one or more processors, is set forth as including operation such as determining that a user has selected a graphical control element at a first composite graphical assistant interface provided at a display panel associated with a client device. The first composite graphical assistant interface can be a modality through which the user can control a connected device that is in communication with the client device. The method can further include causing, in response to determining that the user has selected the graphical control element, the connected device to perform a function that corresponds to the graphical control element. The connected device can be configured to perform a plurality of different functions. The method can also include determining, in response to determining that the user has selected the graphical control element, a user preference that characterizes a historical inclination of the user to control one or more other functions of the plurality of different functions. The method can further include identifying, based on determining the user preference, the one or more other functions of the plurality of different functions; and determining, based on identifying the one or more other functions, one or more graphical control elements for controlling the one or more other functions of the connected device. The method can also include causing, in response to determining that the user has selected the graphical control element, the display panel associated with the client device to supplant the first composite graphical assistant interface with a second composite graphical assistant interface that includes the one or more graphical control elements.

In some implementations, the method can include determining a state of the connected device. The state can be affected by performance of the function and the one or more other functions. The method can also include determining, based on the state of the connected device, an arrangement for each graphical control element of the one or more graphical control elements. In some implementations, the state of the connected device can be based on a resulting condition effectuated by performance or nonperformance of each function of the one or more other functions.

In some implementations, the state of the connected device can be based on a resulting condition effectuated by performance of the function and the second composite graphical assistant interface includes a graphical interface element that indicates the resulting condition. The second composite graphical assistant interface can exclude the graphical control element that corresponds to the function. In some implementations, the user preference characterizes the historical inclination of the user to control one or more other functions of the plurality of different functions based at least on a previous interaction between the user and an automated assistant, which is accessible via an automated assistant interface of the client device. In some implementations, the previous interaction corresponds to a dialog session between the user and the automated assistant, prior to the user selecting the graphical control element; wherein, during the dialog session, the user provided a request to cause the connected device to perform the function.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
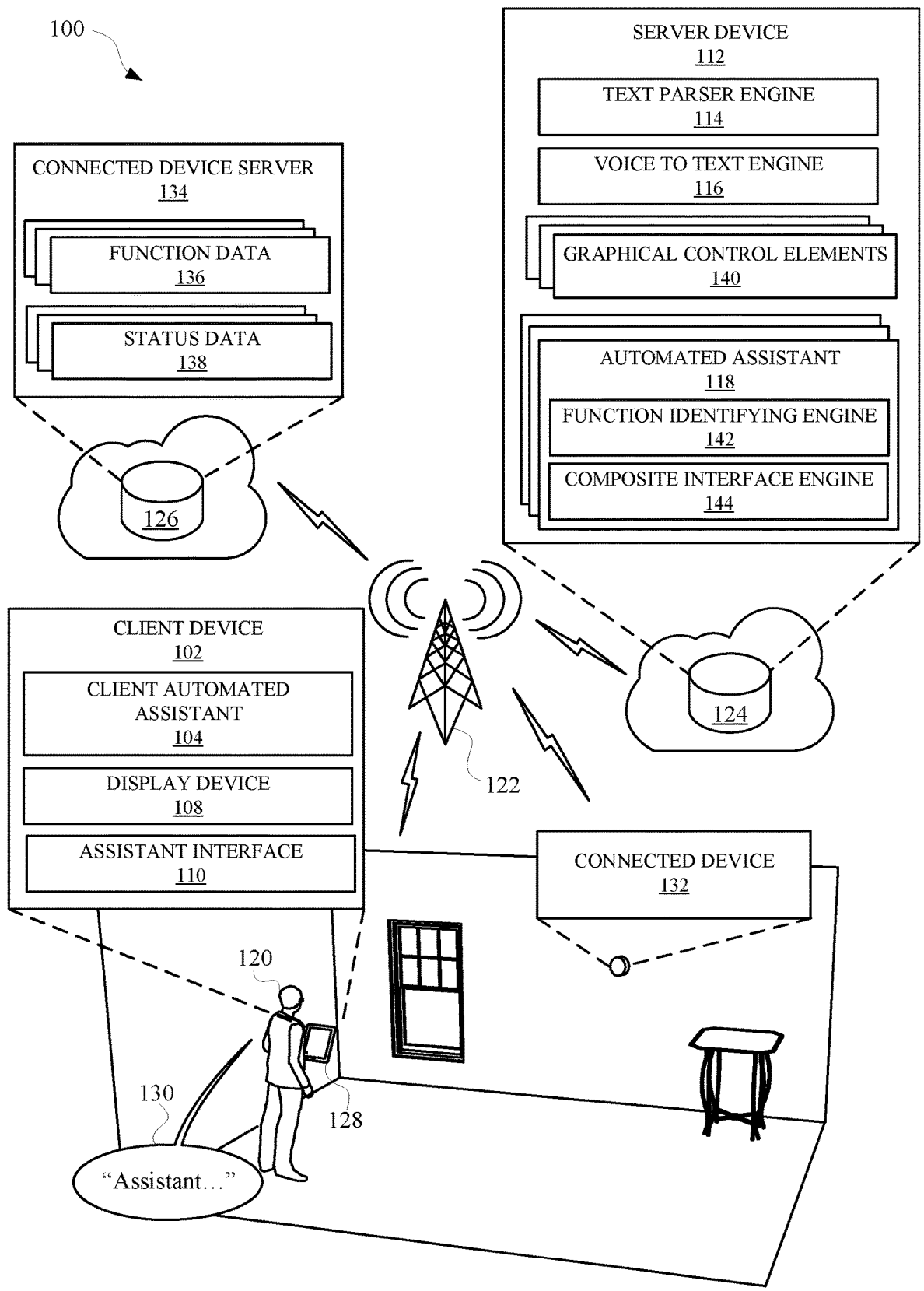
FIG. 1 illustrates a system for assembling composite graphical assistant interfaces for interacting with connected devices.

FIG. 1 illustrates a system 100 for assembling composite graphical assistant interfaces for interacting with connected devices. A composite graphical assistant interface can be generated in part by an automated assistant 118 that is provided at one or more computing devices, such as a client device 102 (e.g., a tablet device 128), and/or a remote computing device 124, such as a server device 112. A user 120 can interact with a client automated assistant 104 via an assistant interface 110, which can be a microphone, a camera, a touch screen display, a user interface, and/or any other apparatus capable of providing an interface between a user and an application. For instance, a user 120 can initialize the client automated assistant 104 by providing a verbal, textual, and/or a graphical input to the assistant interface 110 to cause the client automated assistant 104 to perform an operation (e.g., provide data, control a peripheral device, access an agent, etc.). The client device 102 can include a display device 108, which can be a display panel that includes a touch interface for receiving touch inputs and/or gestures for allowing a user to control applications of the client device 102 via the touch interface.

The client device 102 can be in communication with the remote computing device 124 over a network 122, such as the internet. The client device 102 can offload computational tasks to the remote computing device 124 in order to conserve computational resources at the client device 102. For instance, the remote computing device 124 can host the automated assistant 118, and the client device 102 can transmit inputs received at one or more assistant interfaces to the remote computing device 124. However, in some implementations, the automated assistant 118 can be entirely hosted at the client device 102. In various implementations, all or less than all aspects of the client automated assistant 104 can be implemented on the client device 102. In some of those implementations, aspects of the automated assistant 118 are implemented via the client automated assistant 104 of the client device 102 and interface with the remote computing device 124, which implements other aspects of the client automated assistant 104. The remote computing device 124 can optionally serve a plurality of users and their associated assistant applications via multiple threads. In some implementations where all or less than all aspects of the automated assistant 118 are implemented via a client automated assistant 104 of the client device 102, the client automated assistant 104 can be an application that is separate from an operating system of the client device 102 (e.g., installed "on top" of the operating system)—or can alternatively be implemented directly by the operating system of the client device 102 (e.g., considered an application of, but integral with, the operating system).

In some implementations, the remote computing device 124 can include a voice to text engine 116 that can process audio data received at an assistant interface 110 to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can parsed by a text parser engine 114 and made available to the automated assistant 104 as textual data that can be used to generate and/or identify command phrases from the user and/or a third party application.

The user 120 can interact with a connected device 132 using their client device 102 and/or client automated assistant 104. The connected device 132 can be one or more IoT devices, which can be connected to or in communication with the client device 102 over a local area network and or a wide area network. For instance, both the client device 102 and the connected device 132 can be connected to a Wi-Fi network in a home or other environment. In order for the user 120 to interact with the connected device 132, the user 120 can initialize an application associated with the connected device 132. However, if the user 120 frequently interacts with multiple different connected devices, the user 120 may be required to operate a variety of different applications in order to control each connected device 132. In order to more efficiently use computational resources, and prevent wasting network bandwidth, the client automated assistant 104 and/or the automated assistant 118 can provide a composite graphical assistant interface from which the user can interact with one or more connected devices 132.

In order for the composite graphical assistant interface to be generated, the user 120 can provide a spoken utterance 130 to the assistant interface 110. The spoken utterance can embody a request that indicates the user 120 would like the connected device 132 to perform a particular function. Audio data corresponding to the spoken utterance 130 can be transmitted from the client device 102 to the remote device 124. The audio data can then be processed by the voice to text engine 116 and by the text parser engine 114. Text resulting from the processing of the audio data can be used by a function identifying engine 142 in order to identify one or more functions with which the user 120 is referring to in their spoken utterance 130. For instance, the function identifying engine 142 can compare the text from the spoken utterance 130 to function data 136 made available at a separate remote device 126, such as a connected device server 134. The function data 136 can provide a comprehensive list of functions that one or more connected devices are capable of performing. The function identifying engine 142 can compare the text to the function data 136 in order to identify one or more functions capable of being performed by the connected device 132 and that the user is referring to.

In response to determining that the text corresponds to one or more functions, the automated assistant 118, or the client automated assistant 104, can cause the connected device 132 to perform the one or more identified functions. For example, when the connected device 132 is an IoT device, such as, but not limited to, a thermostat, a function can include changing a temperature setting of the connected device 132. A command for causing the function to be performed at the connected device 132 can be provided from the server device 112 to the connected device 132. Alternatively, the command for causing the connected device 132 to perform the function can be provided from the server device 112 to the connected device server 134, which can communicate with the connected device 132 to cause the connected device 132 to perform the function. Alternatively, the client device 102 can communicate the command to the connected device 132, or the server device 112 can communicate the command to the client device 102, which can communicate with the connected device 132 to cause the connected device 132 to perform the function.

In response to receiving the spoken utterance 130 to cause the connected device 132 to perform the function, the automated assistant can cause a composite graphical assistant interface to be provided at the display device 108 of the client device 102, or a separate display device that is associated with the client device 102. In order to generate the composite graphical assistant interface, the automated assistant 118 can identify, from the function data 136, one or more other functions capable of being performed by the connected device 132. The identified other functions can be used as a basis from which to identify graphical control elements 140, which can act to control each function of the identified other functions at the display device 108. For instance, a function such as turning on and off a fan can be controlled by a graphical control element 140 corresponding to a two-way switch. Furthermore, a function such as adjusting humidity can be controlled using a graphical control element 140 corresponding to a dial, which can be turned to select a value of a range of values. The automated assistant 118 or client automated assistant 104 can map the identified other functions to the graphical control elements 140, which can be stored at or otherwise accessible to the server device 112.

A composite interface engine 144 can map the graphical control elements 140 to the identified other functions in order to generate the composite graphical assistant interface. In some implementations, the automated assistant 118 can access status data 138 corresponding to a status or state of the connected device 132. The status data 138 can indicate the status, which can be affected by performance or non-performance of one or more functions of the connected device 132. For example, a status of the connected device 132 can be "off" when no function of the connected device one of the 32 is being performed. Alternatively, the status can correspond to a table or string of data that indicates a condition(s) or parameter(s) of particular functions of the connected device 132. The status of the connected device 132 can be used as a basis from which to determine configurations for each graphical control element 140 that has been mapped to a function of the connected device 132. For example, if the connected device 132 includes a light that is in an off state, and a function of the connected device 132 is to turn on or off the light, a graphical control element corresponding to a light switch can be provided at the composite graphical assistant interface and configured in a way that shows the light switch being off. In other words, each graphical control element can reflect a current state of the connected device 132 when the composite graphical assistant interface is presented at the display device 108.

In some implementations, an arrangement and/or a selection of the graphical control elements for the composite graphical assistant interface can be based on data associated with interactions between the user 120 and the automated assistant and/or the connected device 132. For example, a particular group of graphical control elements corresponding to a particular group of functions can be selected for a composite graphical assistant interface based on a user having previously caused such functions to be performed within a threshold period of time. Alternatively, or additionally, the particular group of graphical control elements corresponding to a particular group of functions can be selected for a composite graphical assistant interface based on how a function affects a particular user, a particular location, a particular device, and/or any other relationship that can be exhibited by functions of a device. For example, a composite graphical assistant interface generated for a user can include graphical control elements corresponding to functions of a connected device that affect a home in which the user is currently located. Therefore, the selection of the graphical control elements can be based on the location of the user, an identifier for the connected device, a calendar schedule of the user, and/or any other data that can be used to estimate geolocation data for the user.

In some implementations, the user 120 can provide a spoken utterance 130 to an assistant device that lacks an integrated display panel or otherwise cannot readily present a composite graphical assistant interface at the assistant device. In such implementations, the automated assistant can receive the spoken utterance 130 at the assistant device and cause a function requested by the user 120 to be performed by the connected device 132. However, in response to receiving the request to perform the function and determining that a display panel is not available at the assistant device, the automated assistant can identify one or more candidate devices. The candidate devices can be identified based on their ability to display an assistant interface, their proximity to the user 120, their proximity to the assistant device, their proximity to the connected device 132, and/or a preference of the user 120 for a particular candidate device. For instance, when the automated assistant determines that a display panel is not available at the assistant device and determines that a tablet device or television is the next most proximate display device to the assistant device, the automated assistant can cause the tablet device or the television to present the composite graphical assistant interface. In this way, because the user 120 may not always be near a display panel when they are requesting a particular function be performed by a connected device 132, the automated assistant can still cause the composite graphical assistant interface to be generated at a nearby display device. In some implementations, the automated assistant can cause the assistant device the audibly notify the user 120 of the location of the composite graphical assistant interface in response to the user 120 providing the request for the connected device 132 to perform a function. For instance, in response to the user 120 providing the spoken utterance, "Assistant, please turn on my kitchen lights," the automated assistant can cause the assistant device to audibly output the response, "Ok, I've provided an interface with additional controls at your tablet device." The automated assistant can therefore put the user 120 on notice that they can find additional controls for their connected device if they go retrieve their tablet device.

Figure 2A:
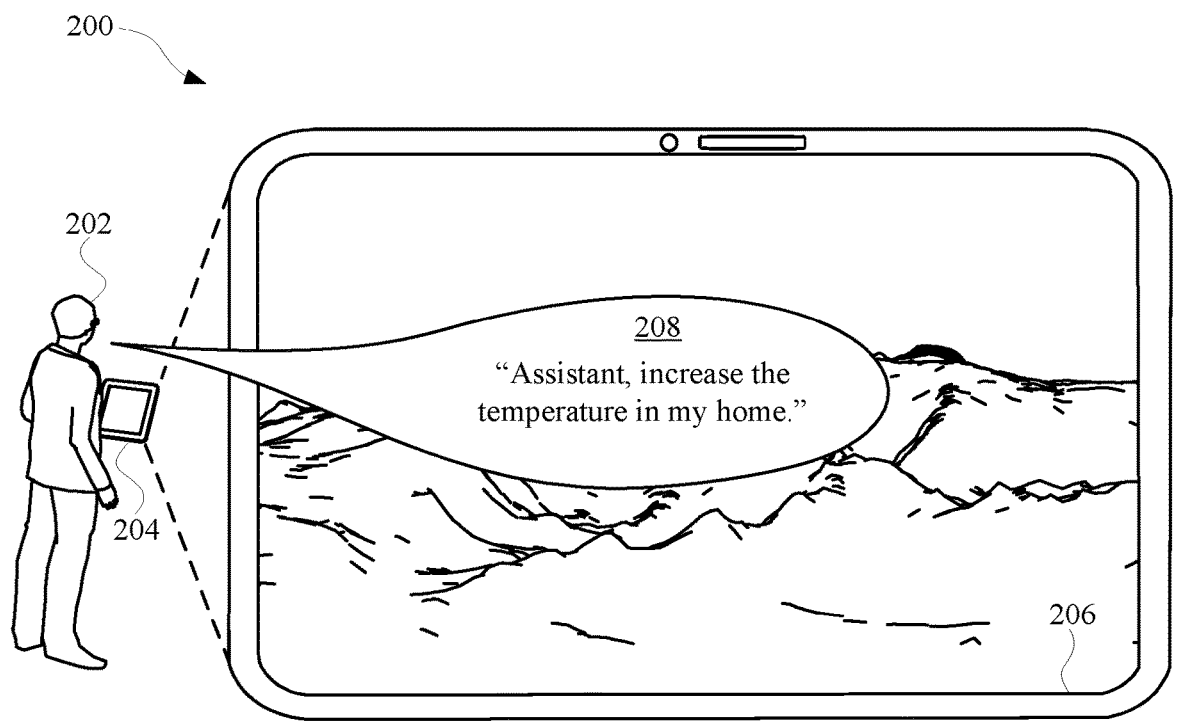
FIGS. 2A and 2B illustrate views of examples of a composite graphical assistant interface generated in response to a user providing a request for a connected device to perform a particular function.
Figure 2B:
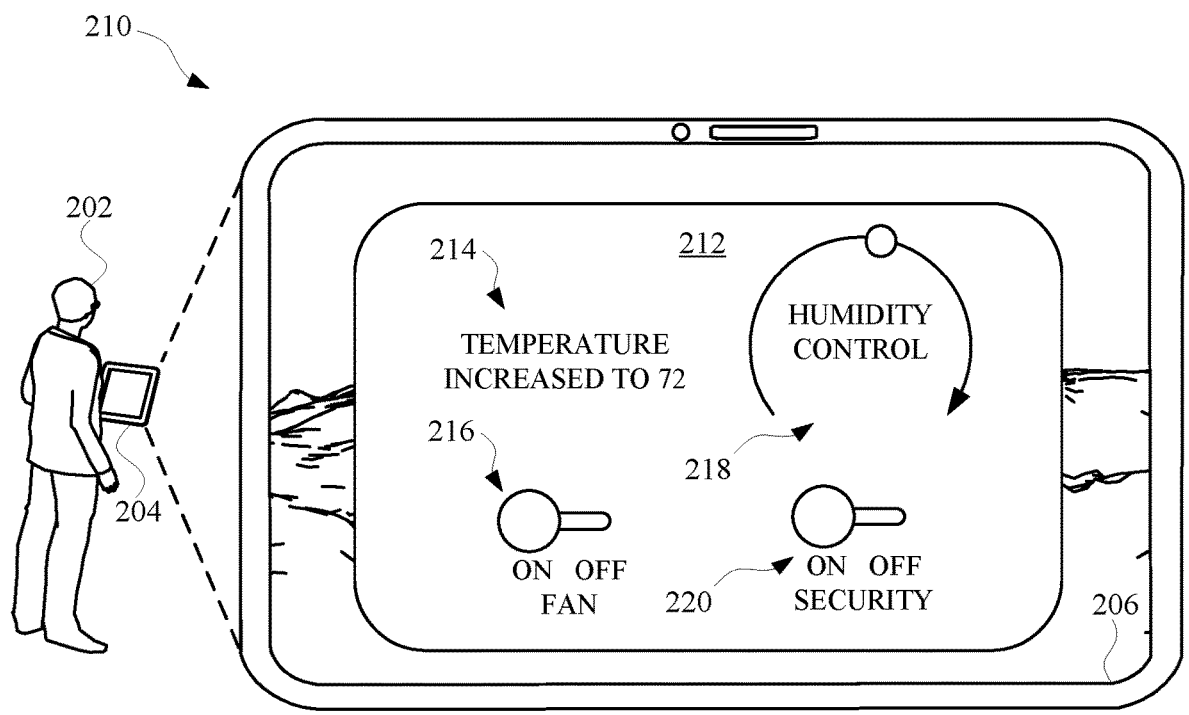

FIGS. 2A and 2B illustrate views 200 and 210 of examples of a composite graphical assistant interface 212 generated in response to a user 202 providing a request for a connected device to perform a particular function. Specifically, the user 202 can interact with a client device 204, such as a tablet device, by providing a spoken utterance 208 to an audio interface of the client device 204. The spoken utterance can be, for example, "Assistant, increase the temperature in my home." In response to receiving the spoken utterance, an automated assistant available at the client device 204 can cause the spoken utterance to be processed in order to identify the request embodied in the spoken utterance 208. The request can correspond to a function of a connected device, such as increasing a temperature at a thermostat. The automated assistant can cause the function to be performed by the connected device, and also cause a composite graphical assistant interface 212 to be provided at a display panel 206 of the client device 204.

FIG. 2B illustrates a view 210 of the composite graphical assistant interface 212 being provided at the display panel 206 of the client device 204. Specifically, because the user 202 requested that the temperature setting be increased, the composite graphical assistant interface 212 can include a notification 214 that the temperature setting was increased to "72." Furthermore, the composite graphical assistant interface 212 can include multiple different graphical control elements from which the user 202 can control other functions of the connected device. For instance, the composite graphical assistant interface 212 can provide a dial 218 for controlling a humidity setting of the connected device. Additionally, the composite graphical assistant interface 212 can include a switch 216 for controlling a fan setting, and a switch 220 for controlling a security setting. In this way, the user 202 does not necessarily need to provide another spoken utterance to the client device 204 in order to cause the connected device to perform different functions. Rather, controls for the functions can be presented in a way that makes them less computationally intensive to control, relative to providing multiple spoken utterances. Although not explicitly illustrated in FIG. 2B, it is noted that in various implementations a graphical control element can also be presented, in the composite graphical assistant interface 212, that enables further adjustment of the function adjusted in response to the spoken utterance 208. For example, the notification 214 can be replaced by a dial (e.g., similar to dial 218) that enables control of the temperature setting of the connected device. Such a dial can also reflect that the temperature setting was increased to "72" (e.g., via display of "72" provided on or near the adjustment element of the dial).

Figure 3A:
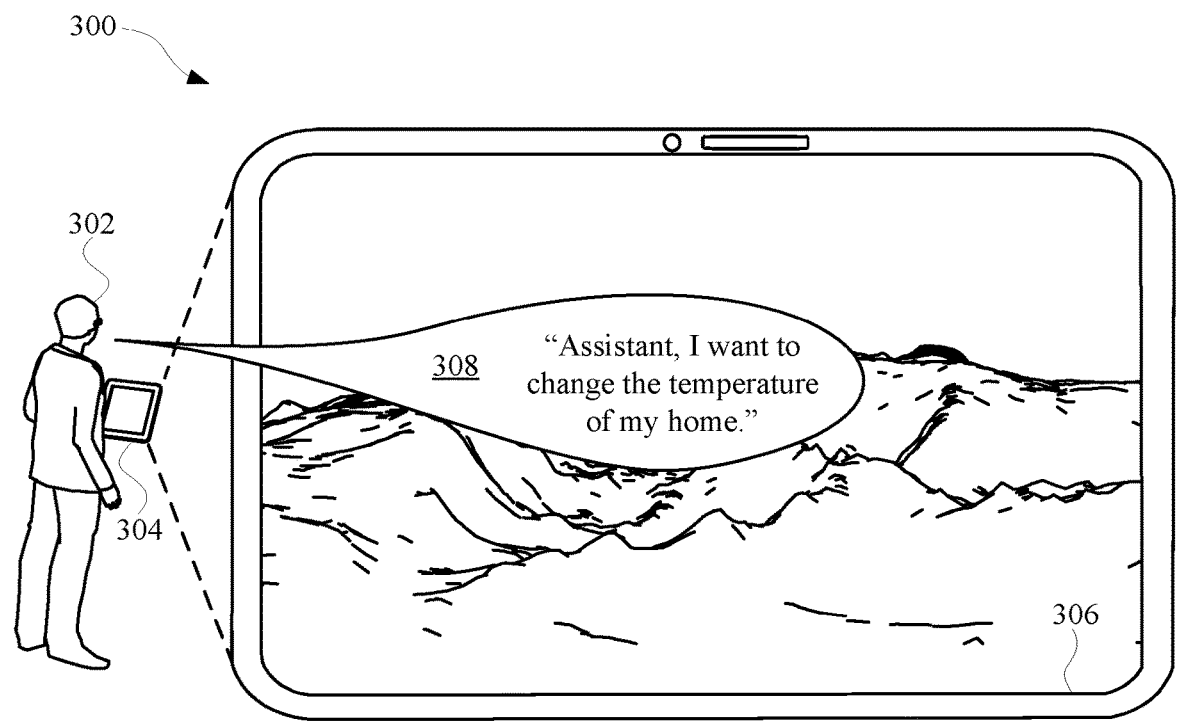
FIGS. 3A and 3B illustrate views of examples of a composite graphical assistant interface generated with suggestions for interacting with a connected device using a variety of different functions.
Figure 3B:
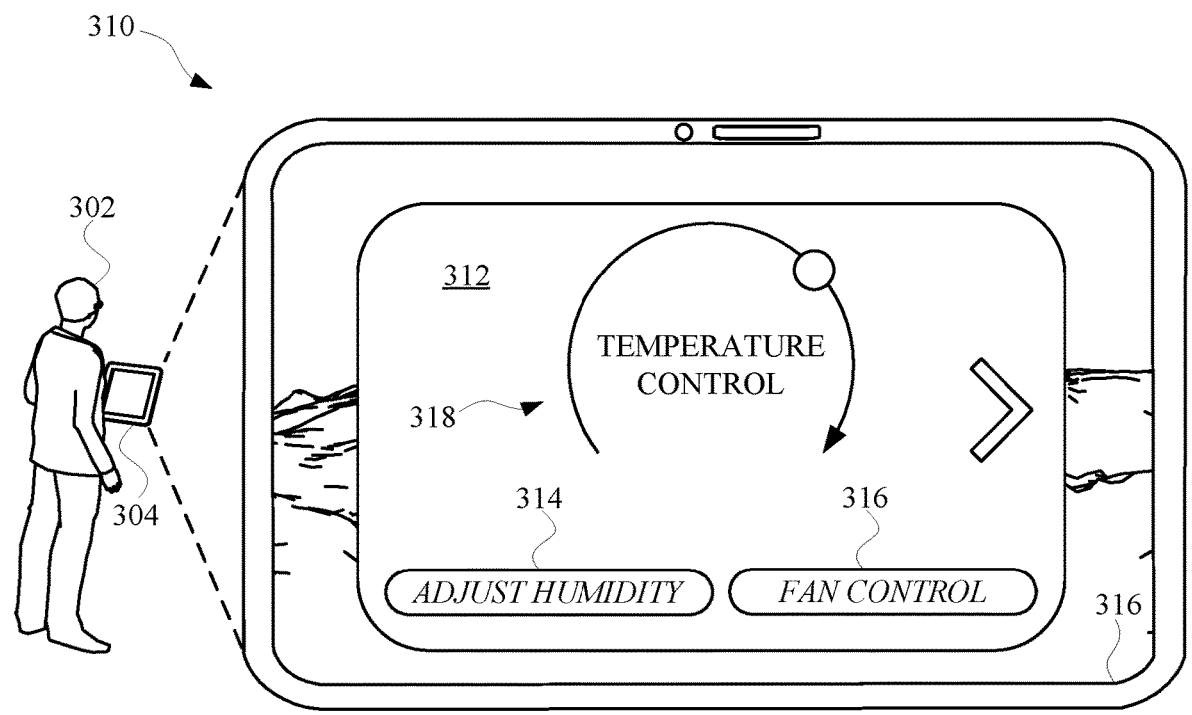

FIGS. 3A and 3B illustrate views 300 and 310 of examples of a composite graphical assistant interface 312 generated with suggestions for interacting with a connected device using a variety of different functions. For example, a user 302 can provide a spoken utterance 308 to an audio interface of the client device 304 in order to interact with or a control a connected device. The spoken utterance can be, for instance, "Assistant, I want to change the temperature of my home." An automated assistant can receive the spoken utterance 308 and cause the spoken utterance 308 to be processed in order to identify a particular function that the user 302 would like to affect or control.

In response to identifying the particular function (e.g., controlling temperature), the automated assistant can compile a composite graphical assistant interface 312 that includes at least one graphical control element for controlling the identified particular function. The automated assistant can also select other elements from which to compile the composite graphical assistant interface. For instance, the composite graphical assistant interface 312 can include a dial 318 for controlling temperature, and also a first link 314 for controlling another function of the connected device (e.g. adjusting humidity) and a second link 316 for controlling yet another function of the connected device (e.g., adjusting a fan). When the user 302 selects, for instance, the first link 314, the composite graphical assistant interface can be supplanted with a different composite graphical assistant interface that includes a dial (such as dial 218 from FIG. 2B) for adjusting humidity. In this way, instead of providing a series of spoken utterances to the automated assistant to determine other functionality of the connected device, various functions can be suggested to the user 302 in response to the user 302 providing an initial spoken utterance related to the connected device. In some implementations, the composite graphical assistant interface 312 can exhibit a current status of the connected device. For instance, the dial 318 can be configured to reflect a current temperature setting of the connected device.

Figure 4A:
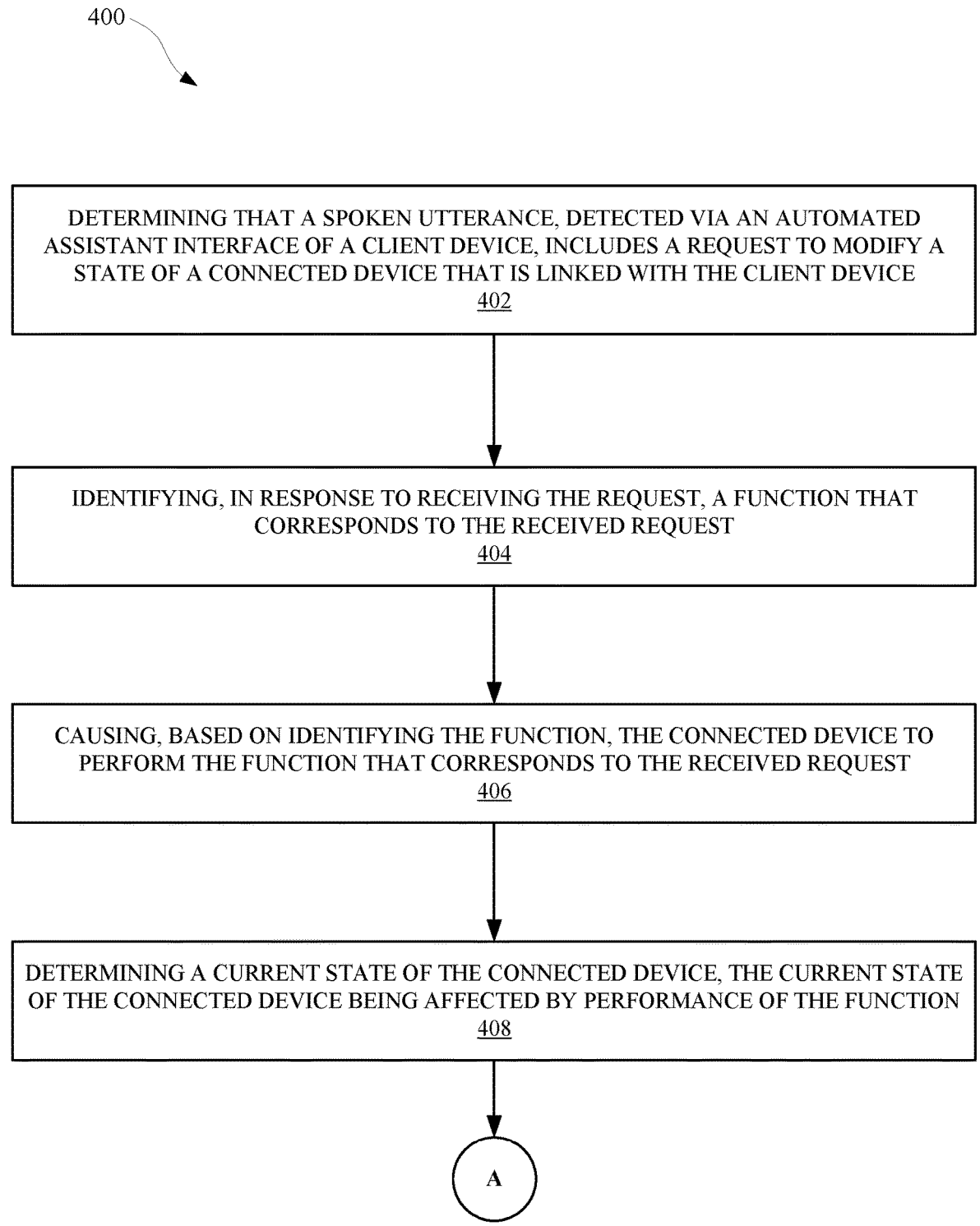
FIGS. 4A and 4B illustrate methods for providing a composite graphical assistant interface for controlling a connected device.
Figure 4B:
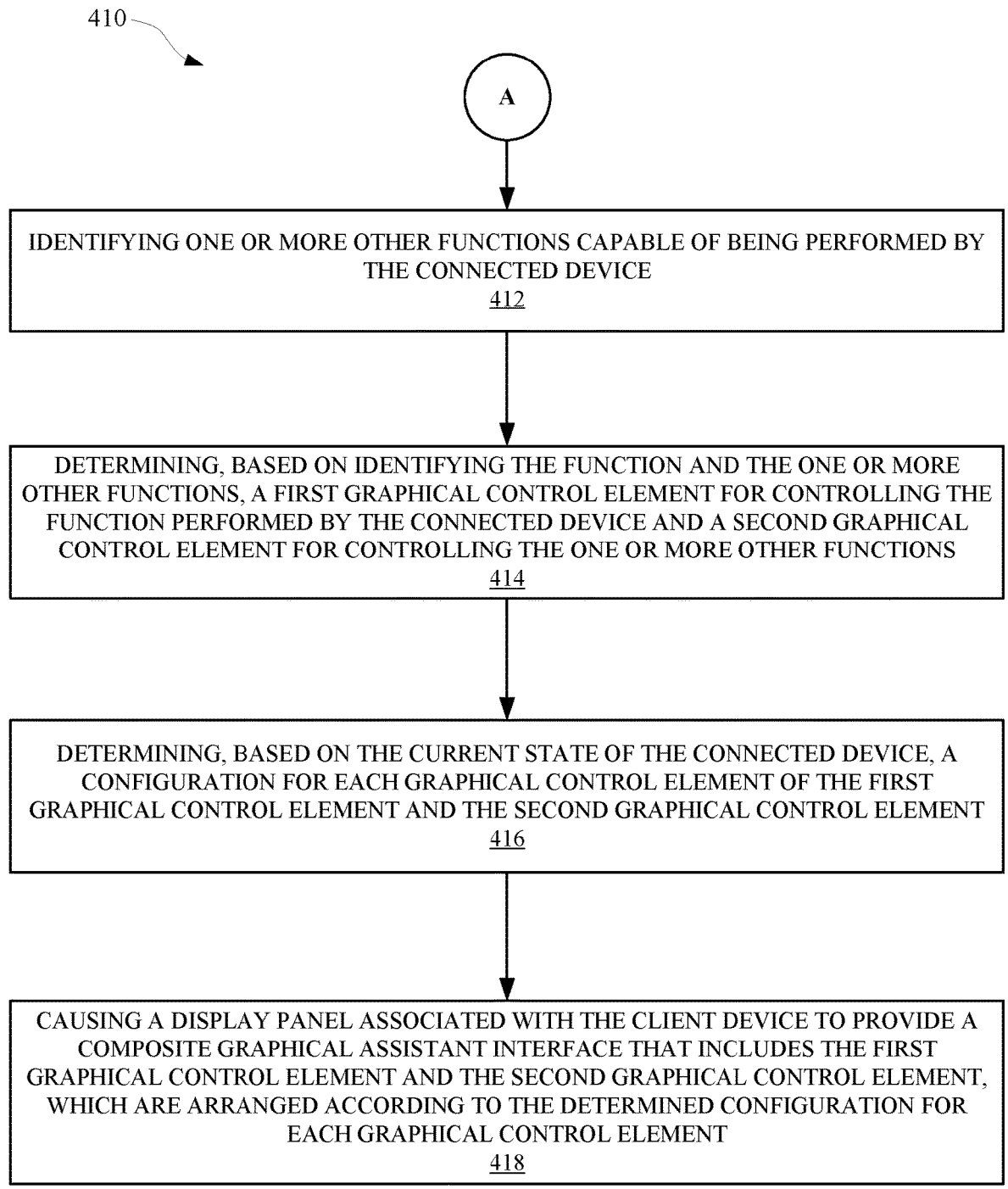

FIGS. 4A and 4B illustrate methods 400 and 410 for providing a composite graphical assistant interface for controlling a connected device. The methods 400 and 410 can be performed by one or more of a computing device, an application, and/or any other apparatus or module capable of interacting with a connected device and/or an automated assistant. The method 400 can include an operation 402 of determining that a spoken utterance, detected via an automated assistant interface of a client device, includes a request to modify a state of a connected device that is linked with the client device. The automated assistant interface can include one or more of a microphone, a touch display, a camera, and/or any other apparatus through which a user can communicate with an automated assistant and/or a computing device. In some implementations, the connected device can be one or more devices that are in communications with the client device and/or an automated assistant that is accessible via the client device. For instance, the client device and the connected device (e.g., an IoT device) can be connected to a local area network (e.g., a Wi-Fi network), in a home of the user, or the client device and the connected device can be connected over the internet.

The method 400 can further include an operation 404 of identifying, in response to receiving the request, a function that corresponds to the received request. A function can be an operation that the connected device is capable of performing or executing. In some implementations, the function can correspond to multiple different operations that can be performed at one or more candidate connected devices. The function can be for example, an operation of turning on lights in a kitchen of the home of the user. The spoken utterance can embody the request for performing the function. For instance, the spoken utterance can be, "Assistant, please turn on the lights in my kitchen." In response to receiving the spoken utterance, the client device can identify a function that most corresponds to the received spoken utterance by comparing text derived from the spoken utterance with available functions that can be initialized at the direction of the automated assistant.

The method 400 can also include an operation 406 of causing, based on identifying the function, the connected device to perform the function that corresponds to the received request. For example, in some implementations, the client device can receive the request and issue a command to the connected device to perform the identified function. In other implementations, the request can be captured at the client device and transmitted to a remote server for further processing. The remote server can then identify the function and transmit a command to the connected device, or a server associated with the connected device, to cause the connected device to perform the function. Alternatively, or additionally, in some implementations, remote server can identify the function and transmit the command to the client device, and in response, the client device can communicate with the connected device to cause the connected device to perform the function.

The method 400 can further include an operation 408 of determining a current state of the connected device. The current state of the connected device can be affected or influenced by performance of one or more functions. For instance, when the function corresponds to a request for lights to turn on, the performance of the function can cause a resulting condition of the connected device (e.g., smart light(s)) to be "on." The current state can therefore be based on one or more conditions that are influenced by performance or nonperformance of one or more functions, respectively. For example, in response to the connected device having a light that is on, the current state of the connected device can be "smart_light(state): ([light:on], [brightness: 50%], [color:flat_white])." The current state of the connected device can be determined by the client device issuing a query to the connected device and receiving, in response, data that indicates the current state of the connected device. Alternatively, or additionally, in response to the connected device receiving a command to cause the connected device to perform the identified function, the connected device can perform the function and provide a confirmation that the function was performed, along with data indicated a current state of the connected device. Alternatively, or additionally, the connected device can communicate a current state of the connected device to a server, and the client device can determine the current state of the connected device by communicating directly or indirectly with the remote server, which can access one or more currents state of one or more connected devices.

The method 400 of FIG. 4A can continue to method 410 of FIG. 4B, as indicated by the continuation element "A," encircled in both FIGS. 4A and 4B. The method 410 can include an operation 412 of identifying one or more other functions capable of being performed by the connected device. The one or more other functions can be different than the previously identified function. For instance, when the identified function corresponds to an operation of turning on a light, the one or more other functions can correspond to an operation of setting a brightness level of the light and/or setting a hue of the light. Furthermore, the one or more other functions can affect the current state of the connected device, depending on whether their performance or nonperformance has resulted in a particular condition(s) at the connected device.

The method 410 can further include an operation 414 of determining, based on identifying the function and the one or more other functions, a first graphical control element for controlling the function performed by the connected device and a second graphical control element for controlling the one or more other functions. Determining the first graphical control element and the second graphical control element can include selecting the graphical control elements from a local or remote memory storage that includes multiple different graphical control elements from which a composite graphical assistant interface can be compiled. Each graphical control element can be stored in association with metadata that can indicate parameters of which a respective graphical control element can control. For instance, the first graphical control element can be associated with binary or "on-off" parameters, thereby indicating that the first graphical control element can control a function that has two states or conditions. Moreover, the second graphical control element can be stored in associated with a range of parameters (e.g., a range of two or more values between 0 and 1, or 0 and 100), thereby indicating that the second graphical control element can control a seemingly analog functions such as a change brightness level and/or a change in hue.

The method 400 can further include an operation 416 of determining, based on the current state of the connected device, a configuration for each graphical control element of the first graphical control element and the second graphical control element. The configuration can refer to an appearance of each graphical control element that reflects the current state of the connected device. For instance, when the initial request corresponds to a function for turning on the lights, and the lights were turned on in response, the first graphical control element can resemble a light switch that is configured in an "on" position, thereby reflecting the current state of the connected device. Furthermore, when the current state of connected device corresponds to a brightness level of 90%, the second graphical control element can resemble an analog dial that is configured at a 90% position, where a knob or dial of the second graphical control element is positioned within one half of a range of the analog dial. In some implementations, metadata associated with each graphical control element can indicate the configuration of each graphical control element, therefore the metadata can be modified or updated to reflect the current state of the connected device when the composite graphical assistant interface is generated.

The method 410 can also include an operation 418 of causing, in response to receiving the request, a display panel associated with the client device to provide a composite graphical assistant interface that includes the first graphical control element and the second graphical control element. Each of the first graphical control element and the second graphical control element can be arranged according to the determined configurations, in order to reflect the current state of the connected device for the user. In this way, the user will be able to quickly acknowledge that the initial request was fulfilled, and that they may also control other functions of the connected device without having to recite additional spoken utterances. This can conserve computational resources, because processing additional spoken utterances can require more processing-intensive than receiving inputs at a graphical user interface. Furthermore, by avoiding processing further additional spoken utterances, the client device can preserve network bandwidth, because audio data associated with the additional spoken utterances would not need to be transmitted to a remote server for processing (e.g., speech-to-text processing).

Figure 5:
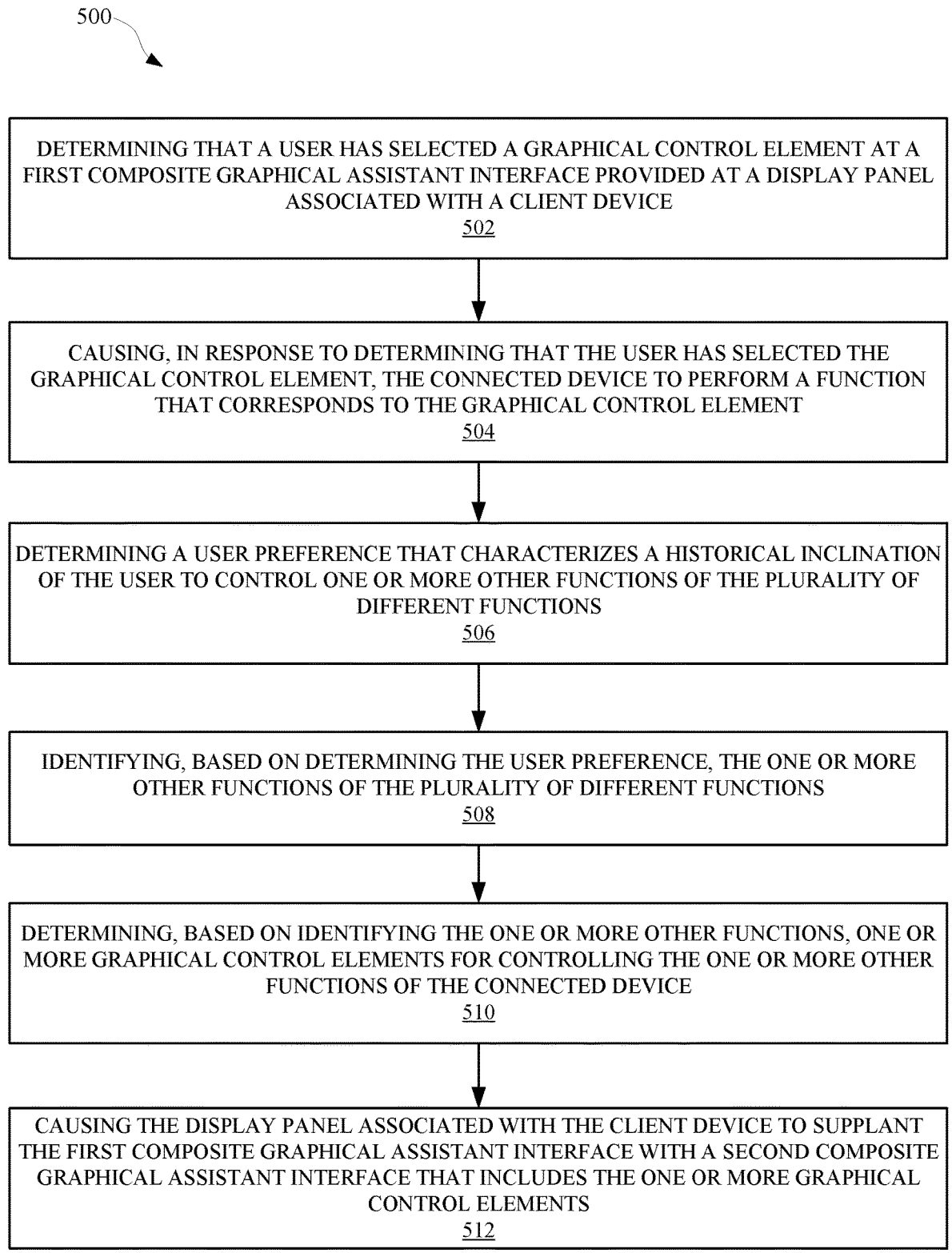
FIG. 5 illustrates a method for providing a graphical control element at a composite graphical assistant interface based on user preferences, in order for a user to control a connected device via the composite graphical assistant interface.

FIG. 5 illustrates a method 500 for providing a graphical control element at a composite graphical assistant interface based on user preferences, in order for a user to control a connected device via the composite graphical assistant interface. The method 500 can be performed by one or more computing devices, applications, and/or any other apparatus or module capable of interacting with a client device and/or an automated assistant. The method 500 can include an operation of determining that a user has selected a graphical control element at a first composite graphical assistant interface provided at a display panel associated with a client device. The first composite graphical assistant interface can be provided at the client device for controlling a connected device that is in communication with the client device over a local area network or a wide area network. The display panel at which the first composite graphical assistant interface is provided can be a touch interface that allows the user to initialize performance of particular functions at the connected device. The first composite graphical assistant interface can be provided by an automated assistant application, which can be used to control multiple different connected devices. The display panel can be integral to the client device or separate from the client device, thereby allowing the user to exhibit some control over the connected device without necessarily directly contacting the connected device. Rather, the user can interact with the connected device through a composite graphical assistant interface that is generated by the automated assistant, in order to provide a standardized interface through which to interact with different devices from different third parties.

The method 500 can further include an operation 504 of causing, in response to determining that the user has selected the graphical control element, the connected device to perform a function that corresponds to the graphical control element. The graphical control element can be a portion of the first composite graphical assistant interface that is selectable via the touch display panel, and can cause particular processed to occur at the client and/or connected device. For example, the first composite graphical assistant interface can be associated with an electromechanical system of the home of the user, and selecting the graphical control element can cause the electromechanical system to perform a function. For instance, the graphical control element can be a slideable element that can be used to adjust a temperature output of an HVAC system. In some implementations, the first composite graphical assistant interface can include multiple different graphical control elements with which the user can control particular functions of the HVAC system. However, the first graphical control element can be limited to those graphical control elements that the user has most frequently used and/or a number of graphical control elements that would suitably fit within a boundary of the first composite graphical assistant interface.

The method 500 can also include an operation 506 of determining a user preference that characterizes a historical inclination of the user to control one or more functions of a plurality of different functions capable of being performed by the connected device. The user preference can be embodied as part of one or more files available at, or accessible to, the client device. The user preference can be a subset of data that is generated based on historical interactions between the user and the automated assistant, the client device, the connected device, and/or any other application or apparatus capable of being controlled at the direction of the user. For instance, the user preference can indicate that the user has previously manipulated the HVAC system (i.e., a connected device) to modify a temperature output of the HVAC system, and shortly thereafter, manipulated a fan of the HVAC system to be on. Therefore, the historical inclination can be that the user prefers to adjust the fan of the HVAC system when they adjust the temperature output of the HVAC system. In some implementations, the user preference can characterize multiple historical inclinations of the user to adjust multiple functions of the connected device.

The method 500 can further include an operation 510 of determining, based on identifying the one or more other functions, one or more graphical control elements for controlling the one or more other functions of the connected device. For example, a connected device such as an HVAC system can perform multiple functions including, changing temperature, humidity, air flow, and/or any other operation. The various functions can be identified by the automated assistant, which can access a list of functions from a remote server and/or the connected device. Alternatively, or additionally, the client device can include an application that is associated with the connected device can therefore provide data corresponding to the functionality of the connected device and/or any functions that can be controlled via the client device and/or the automated assistant.

In some implementations, the one or more other graphical control elements can be selected from a storage of graphical control elements provided at the client device, a different client device, and/or a remote server that is accessible to the client device. The graphical control elements can be stored with metadata indicated the types of inputs and/or outputs they can be employed to receive and/or provide. Therefore, the automated assistant can use the metadata to correlate graphical control elements to functions capable of being performed by the connected device. For instance, if a connected device can perform a function that uses a single slot value with two possible parameters (e.g., on or off), the automated assistant can correlate the function to a binary switch graphical control element (e.g., such as a light switch).

The method 500 can also include an operation 512 of causing the display panel associated with the client device to supplant the first composite graphical assistant interface with a second composite graphical assistant interface that includes the one or more graphical control elements. Supplanting the first composite graphical assistant interface with the second composite graphical assistant interface can include causing the first composite graphical assistant interface to be at least partially or completely replaced by the second composite graphical assistant interface. In some implementations, the second composite graphical assistant interface can indicate successful completion of the function associated with graphical control element selected at the first composite graphical assistant interface. In some implementations, the second composite graphical assistant interface can include a graphical control element that is associated with a selectable link provided at the first composite graphical assistant interface. For instance, the first composite graphical assistant interface can include a selectable link that indicates an available function, and, in response to a selection of the selectable link, the second composite graphical assistant interface can be provided with a graphical element for controlling the available function.

In some implementations, the second composite graphical assistant interface can be arranged to include multiple different graphical control element that correspond to functions the user has previously controlled in the context of controlling the function associated with the selected graphical control element. In this way, the user would not necessarily need to provide a spoken utterance in order to affect the previously controlled functions but, rather, than merely interact with the second composite graphical assistant interface at the display panel. As a result, computational resources and/or network bandwidth can be preserved by eliminating the amount of speech processing that would need to occur in order to control particular functions.

In some implementations, the graphical control elements provided at the second composite graphical assistant interface can be based on a relationship between the functions corresponding to the graphical control elements. For instance, when the connected device is associated with functions that affect different locations of a home and/or different geographic regions, the graphical control elements provided at each composite graphical assistant interface can be organized by a location or geographic region associated with their assigned function. Alternatively, or additionally, the graphical control elements presented at the second composite graphical assistant interface can be selected based on a ranking of their corresponding functions. The ranking can be based on a frequency of use of each function by the user or persons associated with the user, other devices or applications owned or employed by the user, and/or any other data that can be used to recommend particular functions to a user. Furthermore, the second composite graphical assistant interface can be limited to graphical control elements corresponding to functions that have a ranking satisfying a particular ranking threshold.

Figure 6:
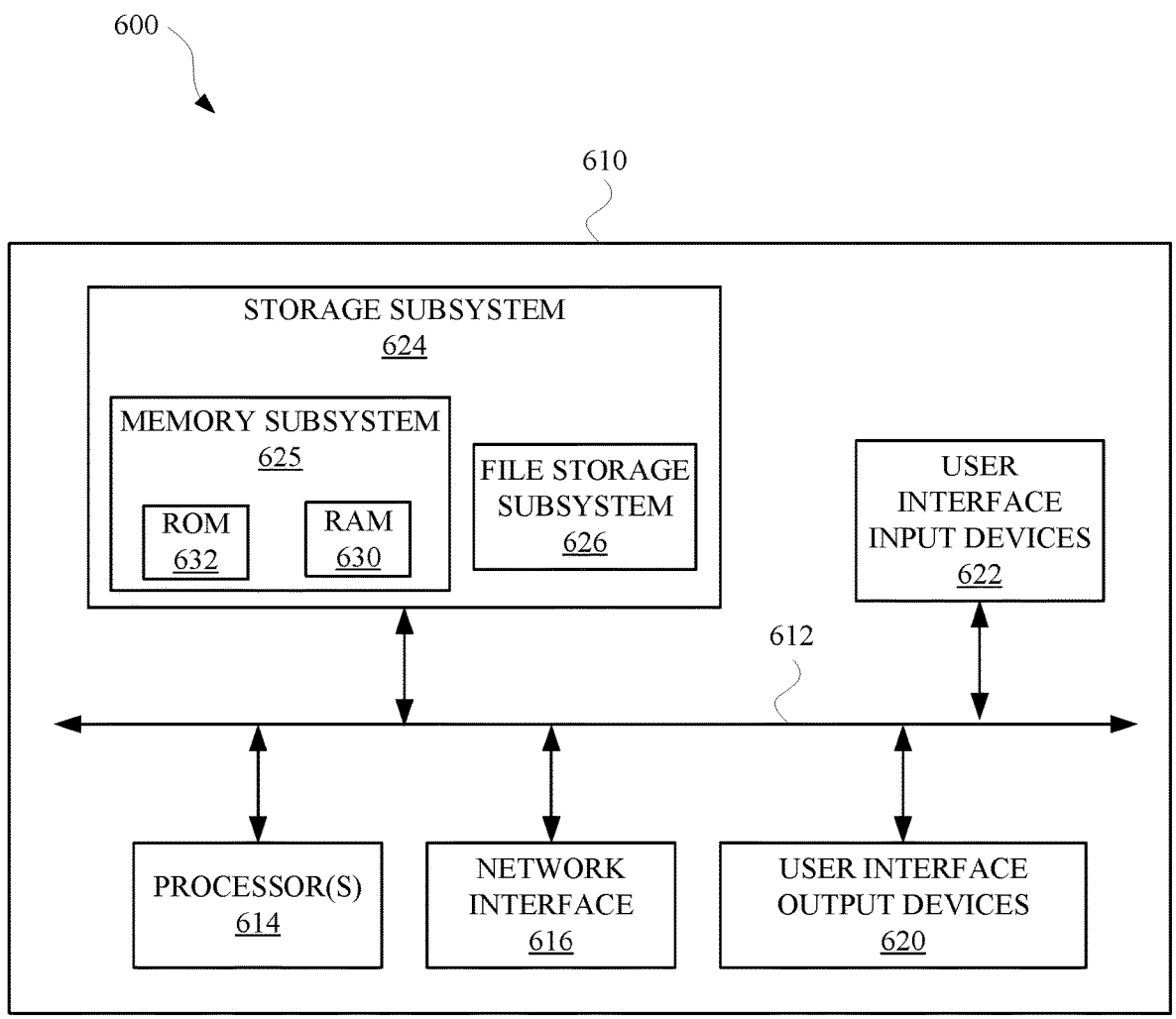
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or to implement one or more of connected device server 134, server device 112, automated assistant 118, client device 102, connected device 132, function identifying engine 142, composite interface engine 144, client device 204, client device 304, and/or any other operation or apparatus discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   determining that a spoken utterance, detected at a client device and via an automated assistant interface of an automated assistant, includes a request to modify a state of a connected device that is linked with the client device, wherein the spoken utterance is provided by a user of the automated assistant;
   identifying, using the automated assistant and in response to receiving the request, a first function that corresponds to the request and first slot values being control parameters for controlling the first function;
   causing, based on identifying the function, the connected device to perform the first function that corresponds to the request;
   determining, using the automated assistant, a current state of the connected device, wherein the current state of the connected device is affected by performance of the first function;
   identifying, using the automated assistant, one or more other functions, capable of being performed by the connected device, and other slot values for the one or more other functions, wherein the current state of the connected device is further affected by performance of the one or more other functions;
   determining, based on detecting the spoken utterance, to render a composite graphical assistant interface, wherein the composite graphical assistant interface was not rendered when the spoken utterance was detected;
   in response to determining to render the composite graphical assistant interface:
      determining, using the automated assistant and in response to identifying the first function and the one or more other functions, a first graphical control element based on a number and/or type of the first slot values for selecting a first slot value to control the first function performed by the connected device and a second graphical control element based on a number and/or type of the other slot values for selecting one or more of the other slot values to control the one or more other functions;
      determining, using the automated assistant and based on the current state of the connected device, a configuration for each graphical control element of the first graphical control element and the second graphical control element; and
   causing, in response to receiving the request, the automated assistant to render the composite graphical assistant interface for controlling the connected device via a display panel associated with the client device,
      wherein the composite graphical assistant interface includes the first graphical control element and the second graphical control element, which are arranged according to the determined configuration for each graphical control element.

2. The method of claim 1, further comprising:
   determining, using the automated assistant, that the user has selected, at the display panel, the second graphical control element, which corresponds to an additional function of the one or more other functions;
   causing, in response to determining that the user has selected the second graphical control element, the connected device to perform the additional function, wherein performance of the additional function causes the connected device to exhibit a modified state; and
   causing, in response to the connected device performing the additional function, the automated assistant to reconfigure the second graphical control element according to the modified state.

3. The method of claim 2, wherein the display panel includes a touch interface through which the user can directly control the first graphical control element and the second graphical control element using one or more gesture inputs.

4. The method of claim 1, further comprising:
   determining, using the automated assistant, a third graphical control element for controlling an additional function of the one or more functions, and a selectable link configured to link to the third graphical control element,
      wherein causing the automated assistant to render the composite graphical assistant interface via the display panel includes causing the selectable link to be provided at the composite graphical assistant interface.

5. The method of claim 4, further comprising:
   determining that the user has selected the selectable link at the display panel; and
   causing, in response to determining the user has selected the selectable link, the automated assistant to render the composite graphical assistant interface including the third graphical control element.

6. The method of claim 1, wherein the client device lacks an integrated display panel, and the method further comprises:
   determining that the client device lacks the integrated display panel; and
   identifying, in response to determining that the client device lacks the integrated display panel, an additional connected device that incorporates the display panel and is linked to the client device,
      wherein causing the automated assistant to render the composite graphical assistant interface, via the display panel, includes causing the display panel of the additional connected device to render the composite graphical assistant interface.

7. The method of claim 6, wherein identifying the additional connected device includes:
selecting, using the automated assistant, the additional connected device, from a plurality of candidate devices, based on a stored device topology that indicates a proximity of the additional connected device relative to the client device.

8. The method of claim 1, wherein the spoken utterance does not include explicit slot values, and wherein identifying the first slot values includes:
processing the spoken utterance to determine an intent of user;
identifying one or more responsive values that fulfill the intent of the user; and
selecting one or more of the responsive values as the first slot values.

9. A system comprising:
one or more processors; and
memory configured to store instructions that, when executed by the one or more processors cause the one or more processors to perform operations that include:
determining that a spoken utterance, detected at a client device and via an automated assistant interface of an automated assistant, includes a request to modify a state of a connected device that is linked with the client device, wherein the spoken utterance is provided by a user of the automated assistant;
identifying, using the automated assistant and in response to receiving the request, a first function that corresponds to the request and first slot values being control parameters for controlling the first function;
causing, based on identifying the function, the connected device to perform the first function that corresponds to the request;
determining, using the automated assistant, a current state of the connected device, wherein the current state of the connected device is affected by performance of the first function;
identifying, using the automated assistant, one or more other functions, capable of being performed by the connected device, and other slot values for the one or more other functions, wherein the current state of the connected device is further affected by performance of the one or more other functions;
determining, based on detecting the spoken utterance, to render a composite graphical assistant interface, wherein the composite graphical assistant interface was not rendered when the spoken utterance was detected;
in response to determining to render the composite graphical assistant interface:
determining, using the automated assistant and in response to identifying the first function and the one or more other functions, a first graphical control element based on a number and/or type of the first slot values for selecting a first slot value to control the first function performed by the connected device and a second graphical control element based on a number and/or type of the other slot values for selecting one or more of the other slot values to control the one or more other functions;
determining, using the automated assistant and based on the current state of the connected device, a configuration for each graphical control element of the first graphical control element and the second graphical control element; and
causing, in response to receiving the request, the automated assistant to render the composite graphical assistant interface for controlling the connected device via a display panel associated with the client device,
wherein the composite graphical assistant interface includes the first graphical control element and the second graphical control element, which are arranged according to the determined configuration for each graphical control element.

10. The system of claim 9, wherein the operations further comprise:
determining, using the automated assistant, that the user has selected, at the display panel, the second graphical control element, which corresponds to an additional function of the one or more other functions;
causing, in response to determining that the user has selected the second graphical control element, the connected device to perform the additional function, wherein performance of the additional function causes the connected device to exhibit a modified state; and
causing, in response to the connected device performing the additional function, the automated assistant to reconfigure the second graphical control element according to the modified state.

11. The system of claim 10, wherein the display panel includes a touch interface through which the user can directly control the first graphical control element and the second graphical control element using one or more gesture inputs.

12. The system of claim 9, wherein the operations further comprise:
determining, using the automated assistant, a third graphical control element for controlling an additional function of the one or more functions, and a selectable link configured to link to the third graphical control element,
wherein causing the automated assistant to render the composite graphical assistant interface includes causing the selectable link to be provided at the composite graphical assistant interface.

13. The system of claim 12, wherein the operations further comprise:
determining that the user has selected the selectable link at the display panel; and
causing, in response to determining the user has selected the selectable link, the automated assistant to render the composite graphical assistant interface including the third graphical control element.

14. The system of claim 9, wherein the client device lacks an integrated display panel, and the operations further comprise:
determining that the client device lacks the integrated display panel; and
identifying, in response to determining that the client device lacks the integrated display panel, an additional connected device that incorporates the display panel and is linked to the client device,
wherein causing the automated assistant to render the composite graphical assistant interface, via the display panel, includes causing the display panel of the additional connected device to render the composite graphical assistant interface.

15. The system of claim 14, wherein identifying the additional connected device includes:
selecting, using the automated assistant, the additional connected device, from a plurality of candidate devices, based on a stored device topology that indicates a proximity of the additional connected device relative to the client device.

16. A non-transitory computer readable storage medium configured to store instructions that, when executed by one or more processors, cause the one or more processors to perform operations that include:

determining that a spoken utterance, detected at a client device and via an automated assistant interface of an automated assistant, includes a request to modify a state of a connected device that is linked with the client device, wherein the spoken utterance is provided by a user of the automated assistant;

identifying, using the automated assistant and in response to receiving the request, a first function that corresponds to the request and first slot values being control parameters for controlling the first function;

causing, based on identifying the function, the connected device to perform the first function that corresponds to the request;

determining, using the automated assistant, a current state of the connected device, wherein the current state of the connected device is affected by performance of the first function;

identifying, using the automated assistant, one or more other functions, capable of being performed by the connected device, and other slot values for the one or more other functions, wherein the current state of the connected device is further affected by performance of the one or more other functions;

determining, based on detecting the spoken utterance, to render a composite graphical assistant interface, wherein the composite graphical assistant interface was not rendered when the spoken utterance was detected;

in response to determining to render the composite graphical assistant interface:

determining, using the automated assistant and in response to identifying the first function and the one or more other functions, a first graphical control element based on a number and/or type of the first slot values for selecting a first slot value to control the first function performed by the connected device and a second graphical control element based on a number and/or type of the other slot values for selecting one or more of the other slot values to control the one or more other functions;

determining, using the automated assistant and based on the current state of the connected device, a configuration for each graphical control element of the first graphical control element and the second graphical control element; and causing, in response to receiving the request, the automated assistant to render the composite graphical assistant interface for controlling the connected device via a display panel associated with the client device, wherein the composite graphical assistant interface includes the first graphical control element and the second graphical control element, which are arranged according to the determined configuration for each graphical control element.

\* \* \* \* \*